(12) United States Patent
Schlecht et al.

(10) Patent No.: US 6,279,639 B1
(45) Date of Patent: Aug. 28, 2001

(54) SEPARATING MECHANISM WITH VARIABLE PULL-BACK FORCE

(75) Inventors: Werner P. Schlecht, Vaihingen/Enz-Aurich; Beate Krause, Rudersberg; Holger Seel, Aidlingen; Marina Ehrenberger, Esslingen, all of (DE)

(73) Assignee: BOS GmbH & Co. (DE)

( * ) Notice: Subject to any disclaimer, the term of this patent is extended or adjusted under 35 U.S.C. 154(b) by 0 days.

(21) Appl. No.: 09/594,616

(22) Filed: Jun. 15, 2000

(30) Foreign Application Priority Data

Jun. 16, 1999 (DE) .............................................. 199 27 384

(51) Int. Cl.[7] ...................................................... E06B 9/08
(52) U.S. Cl. .......................................... 160/23.1; 160/317
(58) Field of Search .......................... 160/23.1, 24, 191, 160/192, 317, 313, 316, 370.22; 296/37.16, 142, 143

(56) References Cited

U.S. PATENT DOCUMENTS

| | | | |
|---|---|---|---|
| 1,709,305 | * 4/1929 | Brunst et al. | 160/317 X |
| 5,275,223 | * 1/1994 | Magro et al. | 160/316 X |
| 5,437,324 | * 8/1995 | Sternquist | 160/317 X |
| 5,711,568 | * 1/1998 | Diem et al. | 160/313 X |
| 5,964,426 | * 10/1999 | Tabellini | 160/316 X |

* cited by examiner

*Primary Examiner*—David M. Purol
(74) *Attorney, Agent, or Firm*—Leydig, Voit & Mayer, LTD

(57) ABSTRACT

A separating mechanism 13 is provided which includes a winding shaft 19 that is rotatably supported in a housing 14. A separating net 15 can be wound on the winding shaft 19 and can be stretched in the space between the housing 14 of the separating mechanism 13 and the roof lining of a passenger car. Since the winding shaft 19 generates a greater torque that the user must counteract with increasing draw-off of the separating net 15, a drive mechanism 18 is provided that provides that from a predetermined draw-out length onward the drive torque for the winding shaft 19 is switched to a reduced level. This switch-over is either brought about as a second, weaker drive spring 39 is activated, or as a second drive spring 93 is switched parallel to the drive spring 38 for the winding shaft 19. The two auxiliary springs 39, 93 operate, however, only over a limited turning range of the winding shaft 19. After this range is exceeded, the full winding force of the main spring 38 becomes effective again in the wind-up process.

27 Claims, 4 Drawing Sheets

SEPARATING MECHANISM WITH VARIABLE PULL-BACK FORCE

FIELD OF THE INVENTION

The present invention relates to a separating mechanism for use in automobiles and, more particularly, to an improved separating mechanism for sealing off the luggage compartment or trunk space of an automobile from the passenger compartment.

BACKGROUND OF THE INVENTION

Separating mechanisms serve, in station wagons or similar vehicles, to provide a mechanical boundary between the loading or baggage space and the passenger space. In a collision or crash, such mechanisms prevent the possibility that objects are flung out of the baggage space into the passenger space and injure or kill passengers there. For this purpose, the opening—for example between the edge above the back seat and the underneath of the inside roof lining—is closed with the separating mechanism if such a danger potentially exists.

If, however, an endangering of the occupants can be precluded with certainty because the loading height in the baggage space does not exceed the back seat height and because even in the case of a accidental collision objects slipping together cannot accumulate to the extent that they can climb over the back-seat, the separating mechanism does not need to be used. On the contrary, it is then rather troublesome.

For this reason the separating mechanism is frequently constructed in the manner of a spring-actuated roll, in which case the separating mechanism has a separating net which is wound in a housing onto a winding shaft. The winding shaft is pre-tensioned in a wind-up direction with the aid of a spring motor and, even in the case of a completely wound-up separating net, a sufficient pull-back force remains.

With a completely wound-up separating net, the bale diameter is great and the winding spring largely relaxed. As the separating net is increasingly drawn out from the housing, the bale diameter on the winding shaft diminishes, while simultaneously the winding spring generates an increasing tension.

At the end of the pulling out process, i.e. when the separating net has been drawn out of the housing to such an extent that the drawbar can be suspended into body-side receiving pockets in the car, the pull-back force has increased to such a degree that suspending the drawbar is very difficult. An unfavorable body position adds to the difficulties.

OBJECTS AND SUMMARY OF THE INVENTION

Accordingly, in view of the foregoing, an object of the invention is to provide a separating mechanism in which the pull-back force is reduced at a drawn-out length of the separating net which corresponds to the length required to suspend the separating net in the car body.

The present invention provides these and other advantages and overcomes the drawbacks of the prior art by providing a separating mechanism having a housing in which a winding shaft is rotatably supported. One edge of the separating net is fastened to the winding shaft, and its other edge, which is parallel to the winding shaft, is provided with a drawbar. The ends of the drawbar project beyond the separating net and can be suspended using corresponding heads which are inserted in car body-side receiving pockets.

A drive mechanism which is switchable between two states is associated with the winding shaft. One state is active in the starting range, i.e. in the pulling out process beginning with the fully drawn-in separating net, up to a predetermined pull-out length. The second state follows upon this. In the starting range, a higher pull-out force is in effect than in the range after the predetermined pull-out length is achieved. An automatic switch over is provided between these two states that is dependent on the pull-out length.

Because the reduction of the pull-back force starts at the predetermined pull-out length, suspending the drawbar into car body-side receiving pockets is substantially eased. When handling the separating mechanism, the user now only has to compensate for the substantially lower pull-back force with his hands, in order to prevent a rewinding of the separating net into the housing.

The predetermined pull-out length at which the drive mechanism switches over to the weaker pull-back force is somewhat longer than is required for suspending the drawbar into the car body. Hereby, the separating mechanism also compensates for car body tolerances.

In order effectuate the automatic switch-over between the various pull-back forces, in the simplest case two drive springs are used. These drive springs can be constructed in such a manner that they generate different pull-back forces.

These two drive springs can be combined with one another in two different configurations. In one embodiment, at the end of the starting range, i.e. at the predetermined pull-out length, the stronger spring is held fast in place, so that only the other drive spring remains active for a limited interval, in which it generates a smaller pull-back force. The consequence is that, in the drawing out of the separating net, the drive spring with the lesser pull-back force is stretched and its stroke is limited by additional limiting mechanisms.

The fundamentally different solution provides for a counter force—i.e. after reaching the predetermined pull-out length the second drive spring is switched parallel and counter a portion of the pull-out force of the first drive spring. In sum, the desired reduced pull-back force remains. In both cases the reduced pull-back force is active only over a short interval of approximately 30 mm to approximately a maximum of 150 mm. Upon exceeding this range in the winding-up direction, only the first drive spring becomes active, and pulls back the separating net with great force into the housing.

The drive springs can be constructed as coil springs which are not easily accommodated in the winding shaft without causing a considerable increase of the space requirement.

Another possibility consists of making one of the drive springs as a spiral spring, similar to a clockwork spring.

The separating mechanism according to the invention can also be constructed so that different pull-out lengths of the separating net are possible. The shorter pull-out length is used when the housing of the separating mechanism is located in the area of the upper edge of the erected back seat. The other, longer pull-out length is used, in contrast, when the housing of the separating mechanism is anchored in the area of the floor, for example when the back seat is turned over or even when the backseat bench is set upright. In this case it is very helpful if the drive mechanism is provided with a counting mechanism which provides that the switch over to the lesser pull-back force occurs at exactly the place that corresponds to the shorter pull-out length.

For switching between the operating states, a blocking mechanism or a coupling mechanism is used, which are in each case releasable and, when the predetermined first pull-out length has been reached, they couple the two drive springs with one another or render one of the two drive springs inactive. This block and coupling mechanism also can expediently be combined with the counting mechanism.

A releasing mechanism provides that the blocking and coupling mechanisms are rendered inactive, and this releasing mechanism becomes active at the second predetermined pull-out length.

The releasing mechanism comprises a releasing element which is untwistably joined with the winding shaft.

These and other features and advantages of the invention will be more readily apparent upon reading the following description of a preferred exemplary embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF PREFERRED EMBODIMENTS

Figure 1:
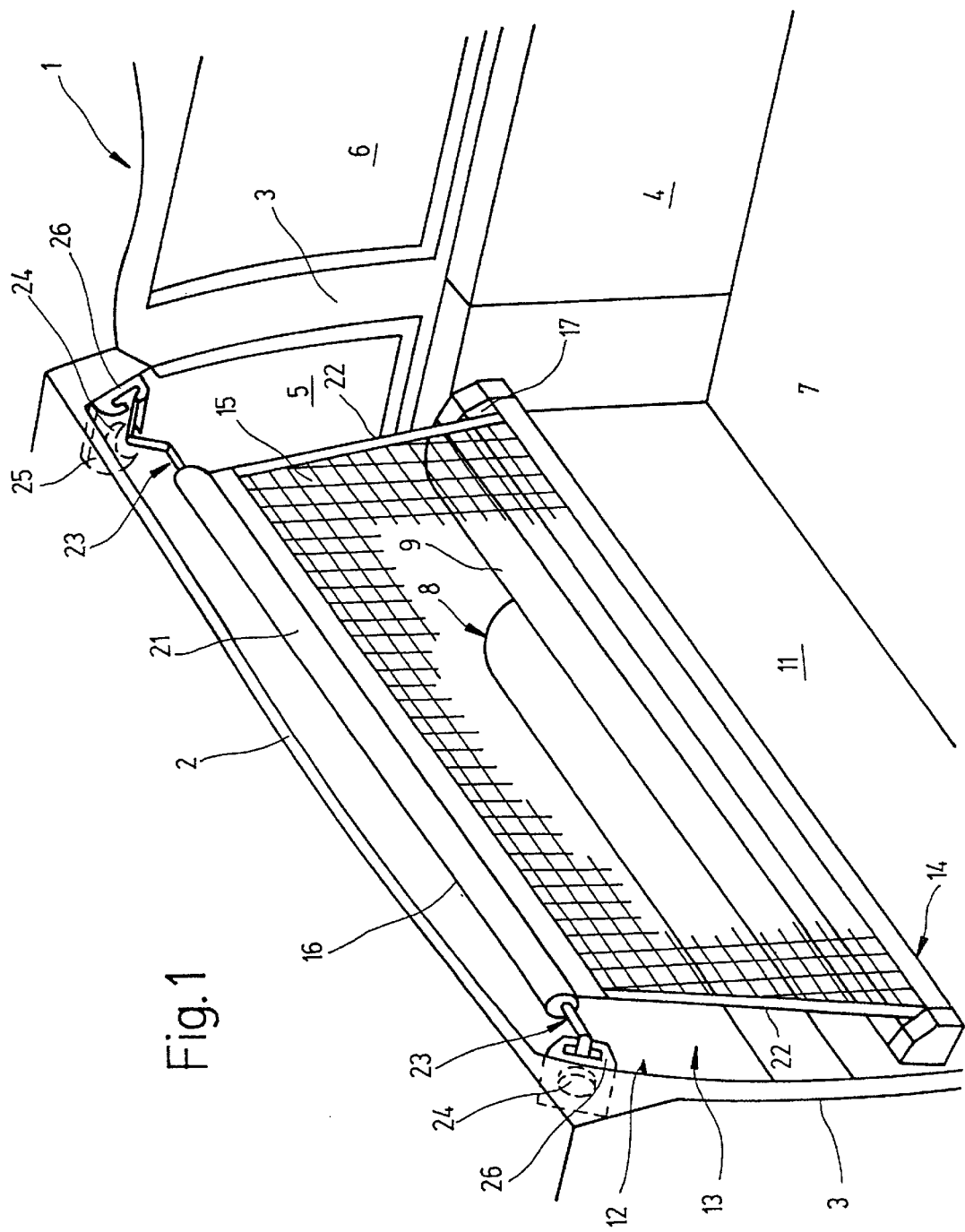
FIG. 1 is a perspective view of an exemplary separating mechanism according to the invention showing it fastened to the back of a rear seat backrest, with the drawn-out separating net suspended under the inside roof lining.

FIG. 1 illustrates, in exploded form, a rear portion 1 of a station wagon. The rear portion 1 is shown in perspective about from the view of the broken-away left side rear window (right and left are used herein with reference to the drawings) and includes a roof 2 which is borne laterally by two C-columns 3. A rear side window 5 is arranged in front of the C-column 3 underneath the roof 2 and above a side wall 4, while a further rear side window 6 is arranged behind the C-column 3. The mechanism of the side windows 5 and 6 is to be imagined in mirror image on the left side of the rear portion. The rear portion 1 is closed off below by a substantially flat loading surface 7.

A rear seat bench 8 is located between the two rear side windows 5 at the height of the C-columns 3, the rear seat backrest 9 of which, with a rear side 11, stands about between the two C-columns 3.

An opening 12 is present between the under-edge of the roof 2 and the upper edge of the back seat backrest 9, through which a passenger space located in front of the back seat backrest is in communication with the cargo space of the rear portion 1 located behind it.

In order to prevent, in case of a crash, objects from being flung out of the rear zone 1 into the passenger space, the opening 12 is closed by a separating mechanism 13. The separating mechanism 13 includes a housing 14, a safety net 15 and a drawbar or strut 16 mounted on the separating net 15.

The housing 14 is an elongated, box-shaped housing which is provided on its upper side with an outlet slot 17 extending through the entire length. A drive mechanism 18 is provided in the interior of the housing 14 in order to pre-tension a rotatably supported winding shaft 19 in the winding-up direction of the separating net 15. The housing 14 is detachably fastened to the rear side 11 of the back seat backrest 9.

The separating net 15 is connected at its edge with the winding shaft 19 and extends, proceeding from the winding shaft 19, through the outlet slot 17 out of the housing 14. The edge of the separating net that is parallel to the winding shaft 19 is provided with a loop 21, which runs over the entire width of the approximately trapezoidal-shaped separating net 15. The strut 16 is arranged in the loop.

In the interest of completeness it is further mentioned that the separating net 15 is reinforced on its two lateral edges by border bands 22.

Anchoring members 23 having mushroom-shaped heads 24 project from both ends of the drawbar or strut 16. When the separating net 15 is stretched open, the mushroom-shaped heads 24 are introduced into closed T-shaped grooves 25 of the end side of the receiving pockets 26. The receiving pockets 26 are located closely underneath the roof lower edge 2.

Figure 2:
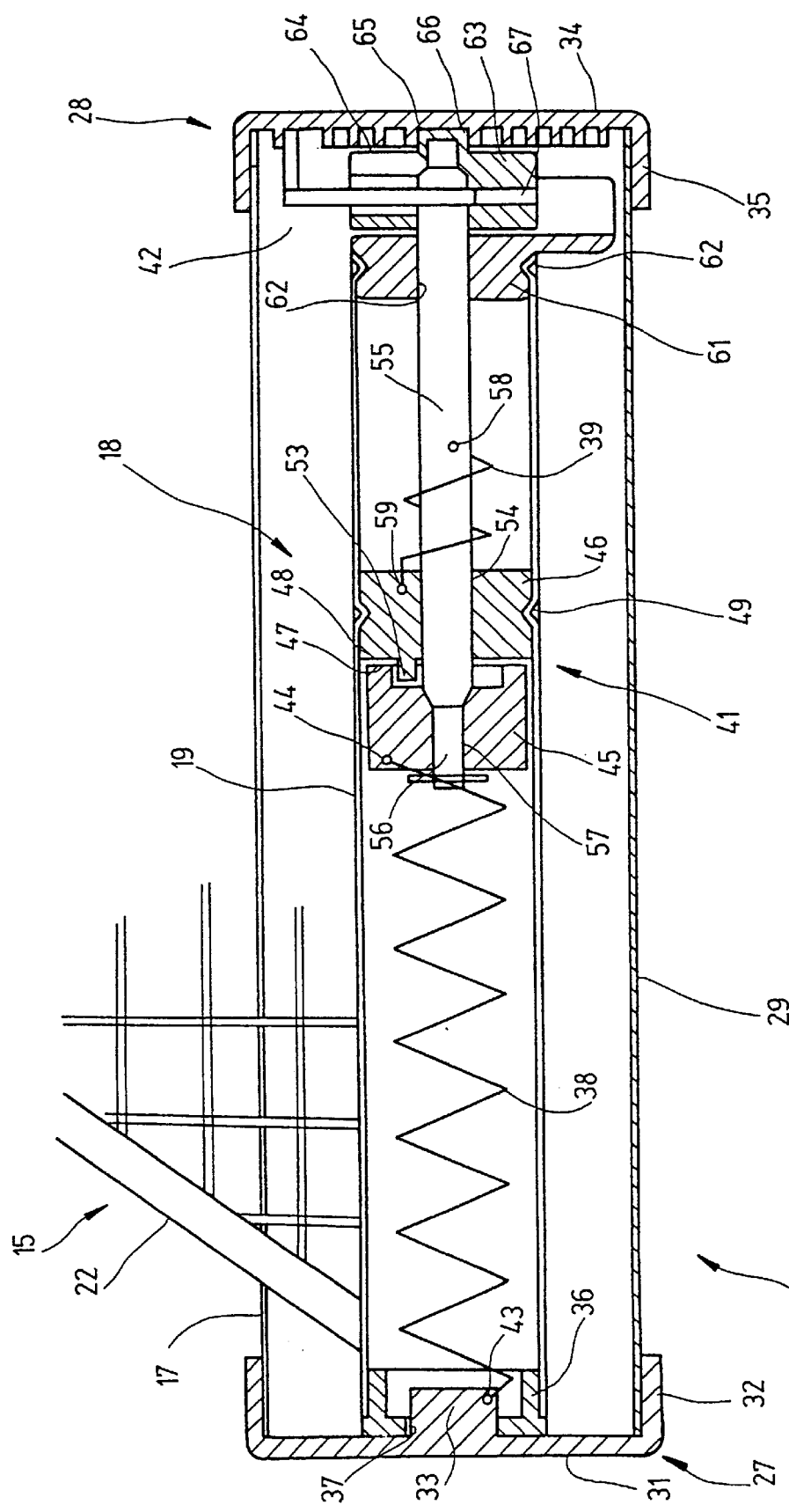
FIG. 2 is a schematic longitudinal section view of the housing of the separating mechanism of FIG. 1.

FIG. 2 illustrates quite schematically a longitudinal section of the construction of the housing 14. The housing 14 includes two cup-like end caps 27 and 28 as well as a tubular housing middle piece 29 which extends between the end caps and in which there is formed the outlet slot 17.

The end cap 27 consists of an essentially flat base 31 which is surrounded on its edge by a collar 32 which is closed on all sides with the exception of the outlet slot 17.

A molded-on cylindrical pivot 53, which serves as journal for the winding shaft 19, protrudes from the inside—i.e. the side of the base 31 arranged opposite the middle piece 29 of the housing.

The cap 28 at the other end has a substantially similar construction, and it consists of a base 34 on which there is molded in one piece a surrounding collar 35, which again with the exception of the outlet slot 17 has a continuous construction.

The winding shaft 19 is a cylindrical metal tube which extends essentially between the two end caps 27 and 28. In the left end of the winding shaft 19, a reducing member 36 with a bore 37 coaxial to the winding shaft 19 is inserted, which is rotatably seated on the journal 33.

The aforementioned drive mechanism 18 is located in the interior of the winding shaft 19. This drive mechanism includes a first drive spring 38 in the form of a winding spring, a second drive spring 39, likewise in the form of a winding spring, a coupling mechanism 41 which acts as a stroke-limiting mechanism, as well as a blocking mechanism 42. The second drive spring 39 generates a lesser torque on the winding shaft 19 than the first drive spring 38.

The first drive spring 38, which serves as the drive spring for the winding shaft 19, is bound on one end at 43 with the journal 33. The other end of the first drive spring is connected at 44 with the coupling mechanism 41. The coupling mechanism 41 consists of two cylindrical pieces 45 and 46, which have face sides 47 and 48 arranged opposite each other, and are rotatable in a limited manner with respect to one another.

The cylindrical piece 45 has a smaller diameter than corresponds to the inside diameter of the winding shaft 19, so that the cylindrical piece 45 is freely turnable with respect to the winding shaft 19. The spring end 44 is fastened to this cylindrical piece 45.

The cylindrical piece 46, in contrast, is held secure against turning in the winding shaft 19 with the aid of impressions 49 and namely so that the two face sides 47 and 48 stand opposite one another with a slight gap.

Figure 3:
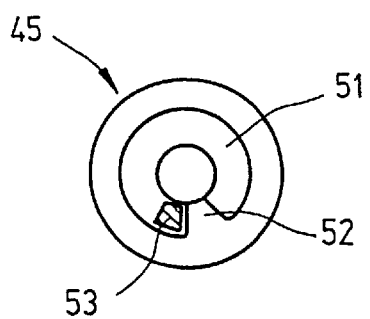
FIG. 3 is a plan view of a portion of the slide-block mechanism for coupling the two drive springs.

An annular groove 51 concentric to the outer circumferential surface of the cylindrical piece 45, which groove describes nearly a full circle is contained in the planar face surface 47, as shown in FIG. 3. The groove 51 is interrupted by a narrow radially running bar 52.

On the opposite, likewise planar face side 48, the cylindrical piece 46 is provided with an entraining lug 53, which plunges into the groove 51. In this manner, the two cylindrical pieces 45 and 46 in common limit the stroke of the drive spring 39.

A bore 54 coaxial to the winding shaft 19 is contained in the cylindrical piece 46, through which there leads a cylindrical coupling shaft 55. The coupling shaft 55 is provided on its left end with a tapered section 56 which is plugged securely against turning in a coaxial bore 57 of the cylindrical piece 45. The coupling shaft 55 and the cylindrical piece 45 are in this manner firmly joined with one another in the axial direction and in the circumferential or peripheral direction. The coupling shaft 55 runs coaxially with the winding shaft 19 and extends, proceeding from the coupling mechanism 41, in the direction toward the end cap 28.

The aforementioned second drive spring 39, which is likewise constructed as a coil spring, is anchored with one end 58 on the coupling shaft 55 and with the other end 59 on the cylindrical piece 56. Therewith, the drive spring 39 is operatively active between the coupling shaft 55 and the winding shaft 19.

For guiding the coupling shaft 55, in the right side end of the winding shaft 19, the winding shaft 19 contains in its end adjoining the end cap 28 a spacer 61 which has a coaxial bore 62 through which the coupling shaft 55 extends so as to be freely rotatable. The spacer 61 is fixed so as to resist twisting in the winding shaft 19 with the aid of impressions 62.

The coupling shaft 55 axially projects with its right end over the spacer 61, and it carries on its axially overhanging part a valve housing 63, which is likewise firmly joined with the coupling shaft 55. On the valve housing 63, a journal bearing 65 is formed on the planar surface 64 lying opposite the base 34 of the end cap 28, that is borne in a corresponding bearing bore 66, which is formed as a blind hole. The blind hole 66 is located on the side facing the middle housing piece of the base 34.

A slide channel 67, which has a substantially rectangular cross section, extends through the valve housing 63. The slide channel 67 extends radially and rectangularly with respect to the axis of the coupling shaft 55. In its section shown above the coupling shaft 55 in the drawing, the slide channel 67 is provided with a cylindrical enlargement which extends from the outer peripheral surface of the valve housing 63 to the coupling shaft 55. Furthermore, by means of a slot, the slide channel opens in this region to the end cap 28.

Figure 4:
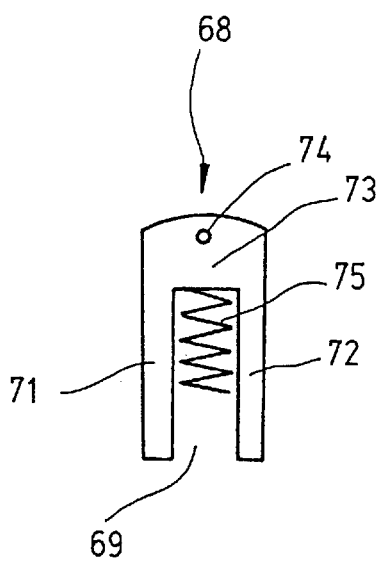
FIG. 4 is a plan view of the slide piece of the blocking mechanism.

A slide piece 68 is slidably seated in the slide channel 67 as shown in FIG. 4. The slide piece 68 has a flat rectangular shape with a cross section corresponding to the cross section of the slide channel 67.

The slide piece 68 is provided, from one side, with a parallel-flank slot 69, whereby two shanks 71 and 72 are formed, which are joined at one end over a back or bridge 73. The width of the slot 69 corresponds to the outside diameter of the coupling shaft 55 in the area of the slide channel 67. Finally, the slide piece 68 carries a guide pin 74 in the area of the back or bridge 73 which extends parallel to the axis of the coupling shaft 55 and points in the direction of the end cap 28.

With the aid of a pressure spring 75, which is contained in the slot 69, the slide piece 68 is tensioned radially outward. The pressure spring 75, which is in the form of a coil spring, is seated in the aforementioned cylindrical extension of the slide channel 67 and is supported at one end on the outer periphery on the coupling shaft 55 and, at the other end, on the base of the slot 69.

Figure 5:
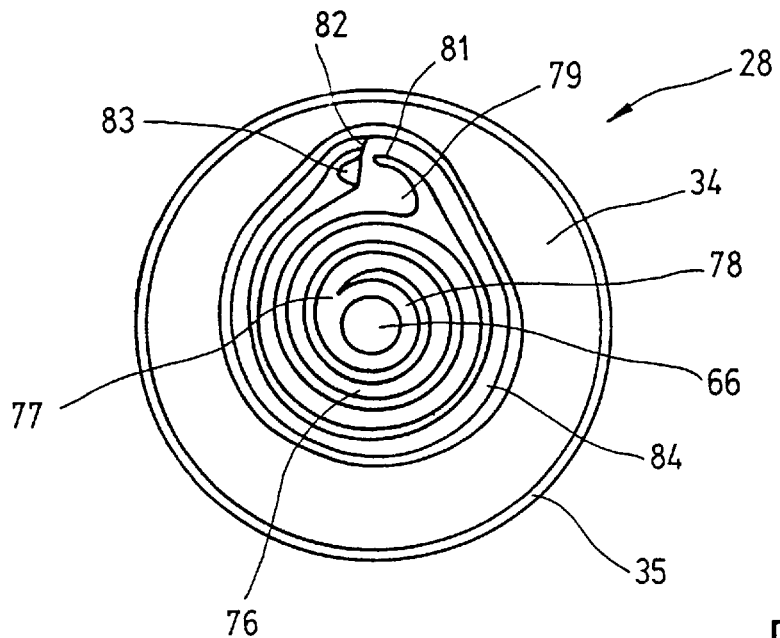
FIG. 5 is a plan view of the right side of one of the two end caps of FIG. 2.

A spiral groove 67 is formed on the inside of the base 34 facing the housing middle piece 29, according to FIG. 5, which follows a right-handed Archimedes spiral. The spiral groove 67 opens at its radially inner end 77 into a cylindrical space 78, which concentrically surrounds the bearing bore 66. The depth of the groove 67 as well as its width is adapted to the geometry of the guide pin 74.

At its radially outside-lying end, the groove 76 extends into a pocket 79 facing the groove 76. The pocket 79 is bounded in the radial direction externally by a wall 81, the distance of which from the wall of the groove is otherwise greater than the width of the groove 76. A leaf spring 82 is aligned with the free end of the wall 81, which is anchored at 83 in the radially outside-lying wall of the groove 76. Between the leaf spring 82 and the wall 81 there remains a gap corresponding to the diameter of the guide pin 74, and the leaf spring 82 crosses a further endless groove 84 which surrounds in an oval manner the outer wall of the groove 76. The leaf spring 82 serves as a shunt (or turnout), as will still be explained further below.

Figure 6:
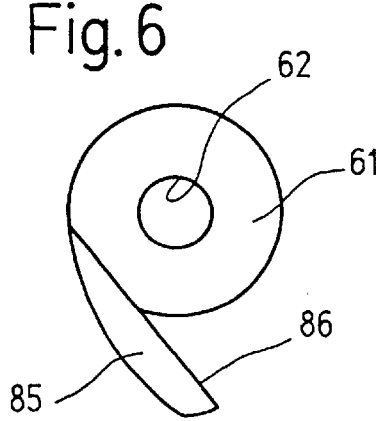
FIG. 6 is a plan view of the releasing mechanism coupled with the winding shaft.

In FIG. 6, the spacer 61 is shown in face view. As can be seen, the spacer 61 is provided with a tangentially extending arm 85, which carries a straight guide surface 86 that faces the axis of the winding shaft 19. The radially outside-lying end of the guide surface 86 has a radial spacing from the axis of the winding shaft 19, which is greater than the radial spacing of the axis of the bearing bore 66 from the most remote point of the outer groove 84 that extends in an oval manner and is closed on itself. The functioning of the described mechanism is as follows:

In the drawn-in state of the separating mechanism 13, the drawbar 16 of the separating net 15 lies against the outlet slot 17 and blocks any further drawing of the separating net 15 into the housing 14. This drawing-in of the separating mechanism is implemented by the drive spring 38. The drive spring 38 tends to turn the winding shaft 19 with respect to the drawings in such manner that the upper side of the winding shaft 19 moves away from the viewer. The driving along or entrainment of the winding shaft 19 takes place as the bar or web 52 of the cylindrical piece 45 comes to lie on the journal 53, and, namely, on that side as is illustrated in FIG. 3.

When the winding shaft 19 is in the position in which the separating net 15 is completely drawn-in, the guide pin 74 of the slide piece 69 is in the cylindrical portion 78 of the end cap 26. In this position, furthermore, the second drive spring 39 is tensioned and the guiding surface 86 is at the greatest distance from the slide piece 68, in the circumferential or peripheral direction.

When, proceeding from this position, the separating net 15 is drawn out, the winding shaft 19 is then set into rotation counter to the action of the drive spring 38. In the drawing-out of the separating net, nothing changes in the relative position between the drive journal 53 and the web 52. The rotation of the winding shaft 19 is transferred directly to the cylindrical member 45. Since the cylindrical member 45 is bound so a to prevent twisting with the coupling shaft 25, in the same direction as the winding shaft 19, the slide piece 68 also rotates about the axis of the winding shaft 19 in the slide channel 67.

In the drawing-out of the separating net 15, the guide pin 74 seated on the slide piece 68 executes a movement in the clockwise direction with respect to the representation of FIG. 5. The guiding pin 74, therefore, after a longer or shorter partial revolution will pass out of the cylindrical space 78 to the beginning 77 of the spiral groove 76. The guiding pivot is pushed radially outward by the pressure spring 75, so that it is directed in its movement about the axis of the winding shaft 19 into the groove.

After approximately two revolutions of the winding shaft 19, the guiding pin 74 is located in the radially outside-lying part of the spiral groove 76 at a distance from the pocket 79 corresponding to a central angle of approximately 30°.

When the winding shaft is turned further over approximately 30°, the pin 74 strikes in the pocket 79 and therewith blocks any further rotary movement of the winding shaft 19. In this state, a sufficient length of the separating net 15 is unwound from the winding shaft 19, which is clearly signaled by the catching of the pin 74 in the pocket 79. The unwound length is greater than corresponds to the distance between the outlet slot 17 and the reception pockets 26. When the user, proceeding from this position, allows the separating net 15 to run back again into the housing 14, the guiding pin 74 strikes on the oppositely situated leaf spring 82. Since the pressure spring 75 further tends to press the slide piece 68 outward together with the guiding pin 74, the guiding pin 74 slides along the somewhat obliquely positioned leaf spring 82 against the outer wall of the outer groove 84.

Since the leaf spring 82 blocks a movement of the guiding pin 74 in a counterclockwise direction, the pin 74 is held pressed against the leaf spring 82 in the groove 84. Thus, first of all rotation of the coupling shaft 55, which is bound unturnably with the slide piece 68, is blocked. The coupling shaft 55 can no longer rotate, whereby the force exerted by the drive spring 38 from the leaf spring 82 is led into the end cap 78 and therewith into the housing 14. The user now only feels on the drawbar 16 the force that is exerted on the winding shaft 19 by the weaker, second drive spring 39.

Conceptually, the process can be analyzed as if only the second drive spring 39 were active, which spring is supported on the end cap 28 over the coupling shaft 35, the slide piece 68, and the guiding pin 74.

The user now can suspend the drawbar 16 directly into the receiving pockets 26. He is no longer compelled to manually compensate for the force which is exerted on the separating net 15 by the substantially stronger drive spring 38 that, in the meantime, has been drawn out over several revolutions.

The possible range over which the weaker, second drive spring 39 is active, corresponds about to a 270° rotation of the winding shaft 19, i.e. to a length of about 70 mm to 110 mm with respect to the stretched-out separating net 15. This range suffices to compensate for spacing tolerances between the receiving pockets 26 and the anchoring of the housing 14 on the back seat backrest 8 and fluctuations in the bale diameter of the wound-up parts of the separating net 15.

When the user wants to drive the separating net completely in again, he takes the drawbar 16 out of the receiving pockets 26 and lets the separating net 15 wind further onto the winding shaft 19.

During the first part of the drive-in movement the winding force only comes from the weaker drive spring 39. As the drive-in movement continues, the guiding surface 86, which is coupled so as to prevent twisting with the winding shaft 19, goes over onto the slide piece 68. After a corresponding movement, the tangentially running guiding surface 86 will come into engagement with the slide piece 68.

The guiding surface 86 moves; if it were projected onto the representation of FIG. 5, in the winding-up of the separating net 15 in the counterclockwise direction and, projected onto the representation of FIG. 5 it would run from the upper left to the lower right. Thus, it produces a radial inwardly directed force on the slide piece 68 which is greater than the radial outwardly-acting force of the pressure spring 75.

The guiding surface 86 will push the slide piece 68 radially inward counter to the action of the pressure spring 75, in which process the guiding pin 74 slides radially inward on the obliquely standing leaf spring 82 and is located in the radially outward-lying beginning of the spirally running groove 76. Thereby, the blocking of the coupling shaft 55 is suspended and it is driven back counterclockwise by the much stronger first drive spring 38, until the bar 52, as shown in FIG. 3, comes to engagement on the drive journal 53. During this transition, the stronger drive spring 38 again moves upward relative to the weaker drive spring 39 which has been increasingly relaxed during the preceding drive-in movement.

From now on only exclusively the further winding-up occurs only and exclusively by the first, stronger drive spring 38.

As is appreciated from the description of the opertion, the spiral groove 76 together with the pocket 79 acts as a counting mechanism which detects the number of turns of the winding shaft 19 to signal the user that now a sufficient amount of the separating net 15 has been drawn out from the winding shaft 19, in order to make possible a comfortable suspension of the drawbar 16 into the receiving pockets 26. If this counting function is not desired, the entire structure which the spiral groove 76 defines on the inside of the end cap 28 can be omitted. It would be sufficient if simply one stop were only present, that corresponds to the leaf spring 82.

In the above-presented description of the operation of the separating mechanism it was assumed that the separating net 15 is used to close only the opening above the raised rear seat backrest 9. To this length or amount of the separating net 15 there is adjusted the length of the groove 76 that runs in spiral up to the pocket 79.

If the user needs the entire cargo space of the passenger car and for this reason wants to turn over the rear seat backrest 9 and possibly also (turn) the back seat bench 8 upright, then the housing 14 must be fastened in the vicinity of the bottom of the cargo space, with the consequence that a larger amount of separating net 15 is required to close the opening of the passenger space.

In this case, the separating net 15 is first of all withdrawn from the housing 14, as described earlier, until the guiding pin 74 is caught in the pocket 79. The user then somewhat relaxes the tension in the separating net 15, and makes it possible for the guiding pin 74 to slide along the leaf spring 82 against the outer wall of the outer guide groove 84. The user now can draw the separating net 15 further out of the housing 14, in which process the guiding pin 74 runs through the outer groove 84. The leaf spring 82 is formed in such manner that it frees the path of movement of the guide pin 74 when the latter approaches the leaf spring 82, from the left with respect to FIG. 5, therefore from the rear side of the leaf spring 82. The leaf spring 82 turns over in the manner of a shunt and allows the guiding pin 74 to pass. In this manner an arbitrary amount of separating net 15 can be drawn out from the winding shaft 18.

When letting the separating net 15 run in, the guiding pin 74 moves counterclockwise through the groove 84 and is deflected by passing, after at most one revolution of the winding shaft 19 on the leaf spring 82 with the aid of the guide surface 86, into the inner spirally running groove 67. After at most a further two-and-a-half revolutions, the guiding pin 74 is in the cylindrical range 78, so that the winding shaft 19 can arbitrarily complete in an unimpeded manner many revolutions, in order to wind up the entire drawn-out amount of separating net 15.

In the described embodiment of the separating mechanism 13, the two springs 38 and 39 are kinematically switched in series. The second spring 39 is weaker and its overstretching in the drawing-out of the separating net 15 is limited by the coupling mechanism 41, which permits a relative rotation between the coupling shaft 55 and the winding shaft 19 of not altogether 360°. At the end of the predetermined pull-out distance, the pull-back force exerted by the first drive spring 38 is blocked, so that the weaker pull-back force corresponding to the second drive spring 39 can become effective.

A lower actuation force for the separating net 15 can be achieved, however, not only by the series switching of two drive springs, but also by a controlled parallel switching of two drive springs and, particularly, in the drawing-out range of interest of the separating net 15, a second spring is switched parallel, which takes up a part of the pull-back force of the primary drive spring. Such an example of execution is shown, in a very schematic manner, in FIG. 7, in which components already described and acting in a kinematically similar manner are provided with the same reference number.

Figure 7:
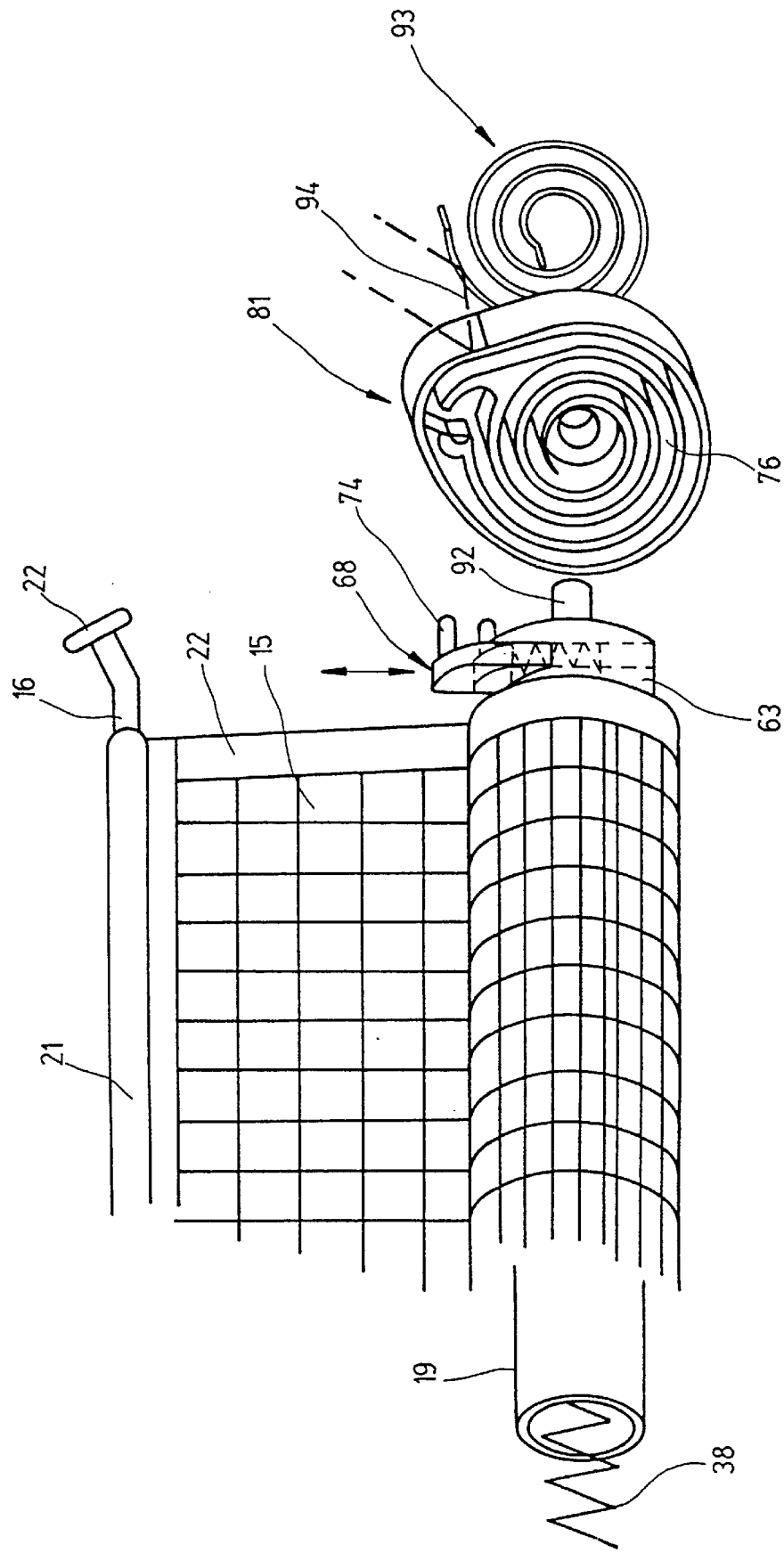
FIG. 7 is a schematic, exploded perspective view of another embodiment of a separating mechanism according to the invention using a compensating drive spring.

In the embodiment according to FIG. 7 the winding shaft 19 is set into rotation in a known manner only by one drive spring which corresponds, for example, to the drive spring 38. One end of the drive spring 38 is fixed directly to the housing 14, while the other end is connected directly to the winding shaft 19.

As in the preceding embodiment, a thrust housing 63 is present, which now, however, is rigidly joined with the winding shaft 19. In the thrust housing 63 there is guided the slide piece 68 and the guiding pin 74 which runs in the spirally running groove 76.

Contrary to the previous embodiment, in which the spiral groove 76 and the outer circulating groove 84 were rigidly joined with the end cap 28, in the embodiment according to FIG. 7, the grooves 76 and 84 are seated in a separate groove housing 91, which is borne freely rotatable on a shaft pin 92 of the winding shaft 19.

The groove housing 91 is pre-tensioned by means of a spiral spring 93 inside the end cap 28 into an end position which corresponds to a position of the grooves 76 and 84 such as is shown in FIG. 5. The spiral spring 93 is kinematically active between the groove housing 91 and the end cap 28 (not illustrated).

Counter to the effect of the spring 83, the groove housing 91, again projected onto the representation according to FIG. 5, can be turned counterclockwise and, particularly, in correspondence to a rotary angle of somewhat less then 360°.

The torque generated by the spiral spring 93 is less than the torque that is generated by the drive spring 38 when a sufficient amount of separating net 15 is drawn-out such that the drawbar 16 can be comfortably suspended into the receiving pockets 26.

The operation of this second embodiment is as follows, in which again there is assumed the completely driven-in state of the separating mechanism:

In the driven-in state, the guiding pin 74 is located in the cylindrical interior space 38 and the spiral spring 93 pretensions the groove housing 91 into the end position, so that a configuration corresponding to the representation according to FIG. 5 results. In the drawing-out of the separating net 15, the guiding pin 74 moves outward along the spiral groove 76 until it is caught in the pocket 79. The user again reduces the tension somewhat in the separating net 15, so that the winding spring 38 can move the winding shaft 19 in the winding direction, whereby the guiding pin 74 presses the leaf spring 82 against the outer wall of the groove 84, which is also the outer wall of the groove housing 91. The torque of the winding spring 38, which tends to turn the winding shaft 19 in the wind-up direction, now acts counter to the torque which the spiral spring 93 exerts on the groove housing 91. The user thus detects on the drawbar 16 a force which corresponds to the difference between the torques that are exerted by the drawn-up drive spring 38 and by the spiral spring 93. The operation is comfortable in the same manner as holds for the embodiment according to FIG. 2.

When the user wants to let the separating net 15 run in again, he takes the drawbar 16 out of the receiving pockets 26 and guides the drawbar 16 in the direction of the outlet slot 17. Then the winding shaft 19 is set into rotation in the wind-up direction, because the drive spring 38 generates a greater torque than the counteracting spiral spring 93. The guiding pin 74 carries housing 91 along the groove; i.e., with respect to FIG. 5, it would turn the groove housing 91 along with itself counterclockwise. In the course of the rotation the guiding pin 74 strikes against a ramp 94 shown in broken lines in the drawing, which is mounted in fixed position in the end cap 28. The guiding ramp 94 presses the guiding pin 74 radially inward, whereby the pin finds its way back along the leaf spring 82 into the spiral groove 76. Thereby, the effect of the compensating spring 93 is suspended, which turns the groove housing 91 back into the starting position corresponding to FIG. 7. The winding shaft 18 now is still set in rotation by only the action of the drive spring 38.

In a separating mechanism 13 a winding shaft 19 is rotatably arranged in a housing 14. A separating net 15 can be wound up on the winding shaft 19, which can be stretched in the space between the housing 14 of the separating mechanism 13 and the roof lining of a passenger car.

Since the winding shaft 19 generates a greater torque which the user must counteract with increasing drawing-out of the separating net 15, a drive mechanism 18 is provided which provides that from a predetermined starting length onward the drive torque for the winding shaft 19 is switched over to a reduced level. This is either brought about as a second, weaker drive spring 39 is activated or as, a second, weaker drive spring 93 is switched over parallel to the drive spring 38. The two auxiliary springs 39, 93 operate only over a limited turning range of the winding shaft 19. After exceeding this range in wind-up direction, the full winding force of the main spring 38 again becomes effective.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A separating mechanism for use in motor vehicles which prevents objects from being flung out of a baggage or cargo space into a passenger space in the event of an accidental collision, the separating mechanism comprising:

a housing having an outlet slot extending parallel to the length of the housing, a winding shaft rotatably supported in the housing, a separating net which extends through the outlet slot, the separating net having two laterally, spaced longitudinal edges with one longitudinal edge being fastened to the winding shaft and the other longitudinal edge being connected to a draw bar for suspended mounting a drive mechanism for the winding shaft including first and second springs which pretensions the winding shaft in a winding-up direction of the separating net and thereby generates a pull-back force for the separating net, said drive mechanism having first and second operating states, said first operating state being operable in a beginning range between a completely drawn-in position of the separating net up to a first predetermined draw-out length and said second operating state being operable beginning at the first predetermined pull-out length, said drive mechanism being operable under the control of at least said first spring during said first operating state to cause a predetermined relatively large pull back force for the separating net and said drive mechanism being operable under the control of at least said second spring during said second operating state to cause a weaker pull back force on said operating net than during said first operating state, and at least one of said springs being inoperable during one of said operating states.

2. The separating mechanism according to claim 1 wherein the second operating state comprises a draw-out range which begins at the first predetermined draw-out length and ends in a location that corresponds to a second predetermined draw-out length that is shorter than the first predetermined draw-out length.

3. The separating mechanism according to claim 1 wherein the predetermined draw-out length of the separating net corresponds to a length slightly longer than required for suspending the draw-bar in the vehicle.

4. The separating mechanism according to claim 1 wherein the drive mechanism includes first and second drive springs.

5. The separating mechanism according to claim 4 wherein the first drive spring is configured to produce a first relatively greater torque on the winding shaft and the second drive spring is configured to produce a second relatively smaller torque on the winding shaft.

6. The separating mechanism according to claim 1 wherein the drive mechanism is configured such that in the second operating state, the second drive spring exclusively generates the pull-back force of the drive mechanism.

7. The separating mechanism according to claim 1 wherein the drive mechanism is configured such that in the second operating state, the first drive spring is inoperative and the second drive spring is active on the winding shaft.

8. The separating mechanism according to claim 1 wherein the drive mechanism is configured such that in the second operating state, both the first and second drive springs are operative.

9. The separating mechanism according to claim 1 wherein the drive mechanism is configured such that in the second operating state the second drive spring is operable so as to partially offset the torque of the first drive spring.

10. The separating mechanism according to claim 1 wherein at least one of the drive springs comprises a coil spring operatively connected to the winding shaft.

11. The separating mechanism according to claim 1 wherein the first and second drive springs comprise coil springs that are operatively connected to the winding shaft.

12. The separating mechanism according to claim 1 wherein at least one of the drive springs comprises a spiral spring.

13. The separating mechanism according to claim 12 wherein the at least one of the drive springs comprising the spiral spring is arranged adjacent the winding shaft.

14. The separating mechanism according to claim 1 wherein the drive mechanism includes a counting mechanism for counting the number or revolutions or partial revolutions of the winding shaft.

15. The separating mechanism according to claim 1 wherein further including a releasable blocking mechanism which, at least in the second operating state renders one of the drive springs in operable.

16. The separating mechanism according to claim 15 wherein the drive mechanism includes a counting mechanism for counting the number or revolutions or partial revolutions of the winding shaft.

17. The separating mechanism according to claim 16 wherein the blocking mechanism cooperates with the counting mechanism.

18. The separating mechanism according to claim 1 further including a releasable coupling mechanism which in the second operating state of the drive mechanism combines the torques of the first and second drive springs.

19. The separating mechanism according to claim 18 wherein the drive mechanism includes a counting mechanism for counting the number or revolutions or partial revolutions of the winding shaft.

20. The separating mechanism according to claim 19 wherein the coupling mechanism cooperates with the counting mechanism.

21. The separating mechanism according to claim 1 wherein the drive mechanism has a groove and a guiding pin which runs in the groove and that either the groove or the guiding pin is joined so as to prevent turning with the winding shaft.

22. The separating mechanism according to claim 21 wherein one of the drive springs is coupled with the spiral groove.

23. The separating mechanism according to claim 21 wherein the spiral groove is arranged in a fixed position in the housing.

24. The separating mechanism according to claim 15 wherein a releasing element for the blocking mechanism is joined with the winding shaft so as to prevent twisting therebetween.

25. The separating mechanism according to claim 1 wherein the end of the first drive spring is connected with an end of the second drive spring over a slide-block mechanism which enables a limited relative movement between the connected ends of the first and second drive springs.

26. A separating mechanism for use in motor vehicles which prevents objects from being flung out of a baggage or cargo space into a passenger space in the event of an accidental collision, the separating mechanism comprising:

a housing having an outlet slot extending parallel to the length of the housing, a winding shaft rotatably supported in the housing, a separating net which extends through the outlet slot, the separating net having two laterally, spaced longitudinal edges with one longitudinal edge being fastened to the winding shaft and the other longitudinal edge being connected to a draw bar for suspended mounting in the vehicle, and a drive mechanism for the winding shaft which pretensions the winding shaft in a winding-up direction of the separating net and thereby generates a pull-back force for the separating net, said drive mechanism including first and second drive springs, said first drive spring being configured to produce a first relatively large torque on the winding shaft and said second drive spring being configured to produce a second relatively smaller torque on the winding shaft, said drive mechanism having at least first and second operating states, said first operating state corresponding to said first relatively large pull back force and said second operating state corresponding to said relatively smaller pull-back force, the first operating state being operable in a beginning range between a completely drawn-in position of the separating net up to a first predetermined draw-out length and the second operating state being operable beginning at the first predetermined pull-out length.

27. A separating mechanism for use in motor vehicles which prevents objects from being flung out of a baggage or cargo space into a passenger space in the event of an accidental collision, the separating mechanism comprising:

a housing having an outlet slot extending parallel to the length of the housing, a winding shaft rotatably supported in the housing, a separating net which extends through the outlet slot, the separating net having two laterally, spaced longitudinal edges with one longitudinal edge being fastened to the winding shaft and the other longitudinal edge being connected to a draw bar for suspended mounting in the vehicle, and a drive mechanism for the winding shaft which pretensions the winding shaft in a winding-up direction of the separating net and thereby generates a pull-back force for the separating net, said drive mechanism having at least first and second operating states, said first operating state corresponding to a relatively large pull-back force and said second operating state corresponding to a relatively smaller pull-back force, said first operating state being operable in a beginning range between a completely drawn-in position of the separating net up to a first predetermined draw-out length and said second operating state being operable beginning at the first predetermined pull-out length, and said drive mechanism including a counting mechanism for counting the number of revolutions or partial revolutions of the winding shaft.

* * * * *